United States Patent [19]
Gillet

[11] Patent Number: 5,396,632
[45] Date of Patent: Mar. 7, 1995

[54] PROLOG INTERRUPT PROCESSING

[75] Inventor: Marc J. L. Gillet, Redwood City, Calif.

[73] Assignee: International Business Machines Corporation, Armonk, N.Y.

[21] Appl. No.: 891,905

[22] Filed: Jun. 1, 1992

Related U.S. Application Data

[63] Continuation of Ser. No. 393,722, Aug. 14, 1989, abandoned.

[51] Int. Cl.$^6$ .................. G06F 13/24; G06F 11/00
[52] U.S. Cl. .................. 395/725; 364/230.2; 364/264.1; 364/DIG. 1
[58] Field of Search .................. 395/650, 700, 725

[56] References Cited

U.S. PATENT DOCUMENTS

| | | | |
|---|---|---|---|
| 4,546,432 | 10/1985 | Umemura et al. | 364/200 |
| 4,783,752 | 11/1988 | Kaplan et al. | 364/200 |
| 4,970,657 | 11/1990 | Wolf | 364/200 |
| 4,970,658 | 11/1990 | Durbin et al. | 364/200 |
| 4,989,132 | 1/1991 | Mellender et al. | 364/200 |
| 5,274,821 | 12/1993 | Rouquie | 395/700 |

OTHER PUBLICATIONS

"Soft Stopping for System Processors, IBM Technical Disclosure Bulletin", vol. 27, No. 10B, Mar. 1985, pp. 6036–6037.
"Picocode Interrupt Mechanism", IBM Tchnical Disclosure Bulletin, vol. 27, No. 10B, Mar. 1985, p. 6045.
David H. D. Warren, "Implementing Prolog", *DAI Research Report No. 39*, vol. I, May 1977.
Gabriel et al., "A Tutorial on the Warren Abstract Machine For Computational Logic", *Argonne National Library*, Jun. 1985.

Primary Examiner—Kevin A. Kriess
Assistant Examiner—John Q. Chavis
Attorney, Agent, or Firm—L. Keith Stephens; G. Marlin Knight; Paik Saber

[57] ABSTRACT

An improved architecture for a Prolog interpreter/compiler is described to facilitate interrupt processing. The new architecture employs interrupt control words and a set of interrupt control blocks to enhance Prolog processing. As interrupts are detected, an interrupt control word is loaded with the address of an interrupt control block for managing interrupt processing. Then, each time a new predicate is fired, the interrupt control word is tested and control is passed to the interrupt processing routine if the control word is non-zero.

17 Claims, 9 Drawing Sheets

PROLOG INTERRUPT PROCESSING

This is a continuation of Rule 1.62 of Ser. No. 07/393,722, filed Aug. 14, 1989, now abandoned.

FIELD OF THE INVENTION

This invention generally relates to improvements in a Prolog interpreter/compiler and more particularly to a technique for adding interrupt processing capability to Prolog instructions.

BACKGROUND OF THE INVENTION

This invention is one of a set of improvements that have been made to create IBM's Prolog for the 370. As the name implies, the compiler has been optimized for IBM's 370/XA environment. However, the invention will perform equally well in any other thirty-two bit architecture. So, for example, the invention could be practiced on an Intel 80X86 processor or a Motorola 680X0.

The first Prolog interpreter was developed in France by Phillipe Roussel in 1972. His early work was expanded upon and first found a home on an IBM S/370 via work done at the University of Waterloo, Canada. A good summary of the history and content of the Prolog language is contained in a report by David H. D. Warren, "Implementing Prolog", *DAI Research Report No. 39* (May 1977).

In his paper, Mr. Warren describes the two basic parts of the Prolog language: logical statements known as Horn clauses and a control language used by the programmer in constructing a proof. Section 4.1 discloses the Prolog Syntax and Terminology that is basic to the understanding of this invention. The language originated in formal proofs. So, for example, P < −Q & R & S is interpreted as, P if Q and R and S. A careful reading of section 4.1 will acquaint the uninitiated reader with an appreciation of the Prolog syntax and major commands.

The Prolog instructions include: get, put, unify, procedural, and indexing instructions. A good summary of the Prolog instruction set is found in another article by Mr. Warren entitled, *AN ABSTRACT PROLOG INSTRUCTION SET*, Technical Note 309, SRI Project 4776 (October 1983). Mr. Warren's article describes the classical Prolog syntax that is accepted as standard to all Prolog Compilers/Interpreters. Further clarification of the Prolog language is found in, *A TUTORIAL ON THE WARREN ABSTRACT MACHINE FOR COMPUTATIONAL LOGIC*, Gabriel et al., Argonne National Laboratory (June 1985).

The classical Prolog system is referred to as the Warren Abstract Machine (WAM) in honor of its inventor. The architecture of the WAM is disclosed in Mr. Warren's, *An Abstract Prolog Instruction Set*. The invention is an improvement on the WAM to address some of the problems that Mr. Warren failed to address.

A recent U.S. Pat. No. 4,546,432 to NEC, entitled Prolog Processing System, discusses an efficient method for managing the registers associated with the various Prolog stacks. However, the patent fails to disclose a method for increasing the Prolog address space and improving overall performance by more effectively managing pointers.

As mentioned above, none of the prior art teaches a technique to provide interrupt processing in a Prolog compiler/interpreter.

SUMMARY OF THE INVENTION

According to the invention, improvements in a Prolog compiler/interpreter are accomplished by adding interrupt processing. Interrupt processing is facilitated under the management of a set of system control words. The system control words are tested before the next predicate is fired and control is passed to an interrupt processing routine via an interrupt control block. When the interrupt processing routine is completed, control is returned to the predicate processor to process the next predicate or interrupt.

BRIEF DESCRIPTION OF THE DRAWINGS

The foregoing and other objects, aspects and advantages of the invention will be better understood from the following detailed description of the preferred embodiment of the invention with reference to the accompanying drawings, in which.

DETAILED DESCRIPTION OF THE INVENTION

Basic Prolog Architecture

Prolog is architected around four basic processes: 1) Recursive procedure calls, 2) Unification, 3) Backtracking, and 4) Cut Operation. Recursion requires proper stack management to function effectively. Unification is a powerful data handling method that encompasses both comparison and assignment instructions found in conventional programming languages. Unification is dependent on efficient data structure processing. This implies a dependency on pointers which means that any improvement in pointer management translates into enhanced execution.

Backtracking provides restoration of a previous computational environment. Backtracking is similar to the program context save and restore that transpires when an interrupt is processed by a typical operating system. Backtracking requires the efficient management of data structures in order to maintain Prolog system integrity and performance. Backtracking is generally implemented by maintaining a list of current changes. The execution of backtrack is to undo these changes. A similar function to the Prolog backtrack operation in a relational database environment is the "rollback" of a relational data base. The Cut operator commits Prolog processing to all computations performed up to the occurrence of the Cut operator.

A Prolog system is divided into a plurality of data areas. The first is the code area. This area is a read-only area containing the program's instructions and literals. The three major writable data areas of the machine are the local stack, global or heap stack and the trail stack. These three stacks are used as storage areas for the global and local variables and for Prolog system restoration. The global variables are long term variables that are defined by the user and remain active until processing is completed or backtracking and/or garbage collection retrieves the space for Prolog. The local variables are used as temporary storage cells to communicate information from one goal to another. Space can readily be recovered from the local stack when a goal completes and no alternatives remain. Stack manipulation requires efficient management of pointers.

The other writable area is a Last-In First-Out (LIFO) stack called the Trail. The trail is used to store the addresses of variable cells which require resetting to UNDEF when backtracking occurs. The trail grows in size in proportion to the number of goals. Trail size is diminished by backtracking. Registers are used to manage the various stack pointers unique to each of the stacks. Mr. Warren's report discusses the classical Prolog system management of the various stacks and their associated register pointers.

Garbage Collection

Garbage collection is the process whereby stack space is compacted, remapped and returned to the Prolog system to facilitate further processing.

Modern Prolog interpreters and compilers trace their origins to Mr. Warren's original work and to the improvements he has introduced incorporated into a classical standard for a Prolog system.

Instruction Set

Mr. Warren's report discusses the instructions and their syntax and illustrates the assembled code generated from Prolog statements. The description of the preferred embodiment diverges from the incompletely optimized code disclosed in Mr. Warren's report. As highlighted in the report, the Warren Prolog compiler required indirect addressing to acquire information. Thus a separate register must be used as an index register and the information from the instruction is used as an offset. The offset is added to the index register to obtain the effective address.

Prolog instructions are used to implement Prolog programs. Generally there is not a one to one correspondence of instructions and Prolog symbols in a classical Prolog Abstract Machine. A typical Prolog instruction consists of an operation code (opcode) with a plurality of operands. The opcode correlates the type of Prolog symbol with the context in which it occurs. The opcode occupies eight bits or one byte. The operands include small integers, offsets, and addresses. These operands in turn correspond to the various Prolog symbols. Depending on the specific Prolog implementation, operands might occupy a nibble, byte, word or double-word.

Interrupt Processing

One of the inventive features of the Prolog system is the new notion of interrupts in Prolog. Some multi-tasking capability is necessary in Prolog, but adding multi-tasking processing is extremely difficult because Prolog uses pre-allocated linear stacks. Thus, a copy of the entire stack is required for each Prolog task to assure system integrity is maintained. Interrupt processing is easier to implement because all of the interrupted programs can share the same stacks.

Interrupt processing is possible by setting a flag registering the occurrence of an interrupt. Then, each time that a new predicate is fired, the flag tracking interrupts is checked to determine if an interrupt has occurred and to initiate processing of the interrupt. This architecture restricts interrupt processing to a single location within Prolog system processing thus exploiting standard Prolog predicate processing mechanisms. Allowing the execution of a predicate to be preempted at any time by the execution of another predicate makes the writing of an optimizing compiler for Prolog very difficult.

The introduction of two kinds of interrupts is used to diffuse this problem. The first, TYPE 1, alters execution so that when an interrupt, such as predicate p(X), is activated instead of the current predicate c( . . . ), the executed goal is:

p(X) & c ( . . . ).

NOTE: the execution of p(X) may fail or create some backtrack nodes.

The second, TYPE 2, alters execution so that when an interrupt, such as a predicate p(X), is activated instead of the current predicate c( . . . ), the executed goal is:

(p(X) & fail; true) & c ( . . . ).

NOTE: the execution of (p(X) & fail; true) will never create a backtrack or modify the instantiation state of the Prolog variables.

TYPE 1 interrupts introduce backtrack nodes in a rather random way and their use in fully compiled code is limited to a small subset of specific interrupts. The content of the Prolog stack is exactly the same before and after the execution of TYPE 2 interrupts, so Prolog can ignore TYPE 2 interrupts when it performs long range optimization of the compiled program. Thus, a TYPE 2 interrupt can be activated before the activation of any predicate of a compiled Prolog code.

Interrupts are useful in Prolog for:
1. activating frozen predicates;
2. debugging step-by-step;
3. activating the garbage collector; and
4. allowing users to process asynchronous events.

Non-Polling Techniques For Interrupt Processing

The PROLOG system must avoid software polling for interrupts during execution to optimize execution. Logical interrupts and daemons are used to provide non-polling interrupt processing. Logical interrupts are software concoctions that register the occurrence of asynchronous events occurring during the execution of a PROLOG program. The event eventually initiates another PROLOG program called a Daemon defined by PROLOG or customized by a user Prolog program. The best analogy to a Daemon in classical computer processing is a task. A task is a set of instructions often for a single purpose that often requires specific inputs to execute. Tasks can be suspended while they await completion of other tasks that may feed information to a suspended task. A Prolog Daemon is initiated to process the interrupt during the designated time between predicates. Some examples of logical interrupt processing are provided below.

Delayed Evaluation

Predefined PROLOG logical interrupts include delayed evaluation. Delayed evaluation is the instantiation of a frozen variable. A frozen variable is a variable awaiting the completion of another goal to complete its processing. The Daemon is the waiting predicate in this example. A frozen variable is a special unbound variable. When a value is given to this variable, a user defined Prolog predicate is triggered.

Garbage Collection

The logical interrupt is the global of trail stack overflow, and the Daemon is the garbage collector. When a stack overflow occurs, the size of the stack is incremented by a small amount to allow the Prolog process to continue until the next Type 1 interrupt is detected. Then, the garbage collector processes the stack to reclaim space. The small incremental areas, one for the trail stack and one for the global stack, are pre-allocated when the stacks are initialized.

The garbage collection cannot be done when the stack overflow occurs, but occurs at the activation of the next predicate. This is due to the uncertainty of leaving elements in the middle of a computation.

Step by Step Debugger

The logical interrupt is the step from one predicate to the next, and the Daemon is the Debugger itself.

External Terminal Interrupt

The logical interrupt is the action of the user via terminal entry, and the Daemon is the PROLOG user code that was previously defined as the handler of the terminal interrupt.

Interrupt Processing Logic

The interrupt events are captured asynchronously from normal PROLOG execution via logical interrupt processing. However, the events are analyzed and processed at execution "safe points" only. The "safe points" occur at the switch from one predicate to the next predicate. At that moment, PROLOG must check to determine whether any pending interrupts require attention. This determination requires only a test of a memory location (flag), approximately two instructions:

1. test Flag for pending interrupt, and
2. branch on Flag to the logical interrupt handling routines.

PROLOG clearly needs a better way to handle pending logical Interrupts without testing for them explicitly. The invention exploits the common invocation mechanism of predicate processing used in all Prolog systems. All predicates whether interpreted, incrementally compiled, or fully compiled, use the same (short) sequence of instructions commonly located in a permanent read-write area named "CSINT". At location "EXEC" in "CSINT" the predicate invocation sequence starts.

When no logical interrupt is pending, the sequence locates the next predicate execution address and branches to the predicate for normal execution. This is standard Prolog predicate processing. However, when a logical interrupt is pending, the first instruction of that sequence is replaced by a branch to the logical interrupt handler routine.

The replacement occurs when the asynchronous event occurred, that is, when the logical interrupt was recorded. In addition to setting the interrupt trap in the "EXEC" instruction, the logical interrupt enqueues on an external logical interrupt queue. When branched to from "EXEC", the logical interrupt handler transfers the contents of the external queue, to the internal logical interrupt queue, and the external queue is emptied. Careful use of the external queue is necessary to assure that its modification in the logical interrupt recording routine, and the logical interrupt handling routine, employ a "CS" instruction (Compare and Swap).

During the transfer from the external queue to the internal queue, the logical interrupts are ordered by priority. Then the pending logical interrupt with the highest priority is dequeued and its associated daemon is scheduled for execution.

If the internal queue is emptied by the dequeuing, then the interrupt trap reverts to its normal value and executes the normal, next predicate.

Detailed Interrupt Logic

Figure 1:
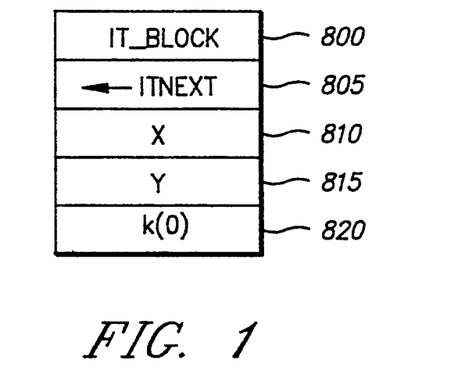
FIG. 1 is an illustration of a data structure employed in interrupt processing in accordance with the present invention.

When an interrupt associated with a predicate p(X,Y,k(0)) is detected, the control block shown in FIG. 1 is constructed in the heap stack to process the logical interrupt. ITBLOCK 800 is the address of the predicate descriptor of p(*,*,*). <- - - ITNEXT 805 is a pointer to the address of the next interrupt control block, or zero if there are no other interrupts that require processing. X 810 is a pointer to the globalization information for X. Y 815 is a pointer to the globalization information for Y. k(0) 820 is a pointer to the globalization information for k(0).

Two global words in common storage, WAITITS and WAITITU are used to flag the occurrence of an interrupt. WAITITS is used to flag interrupts sensitive to backtracking, while WAITITU is used to flag interrupts insensitive to backtracking. The word WAITITU/WAITITS contains a zero if no interrupt has occurred or the address of the first interrupt control block if an interrupt has occurred. The interrupt trap is set when WAITITU or WAITITS is non-zero. There is use for both interrupts sensitive to backtrack and insensitive to backtrack. For example, if there is a Prolog interrupt associated with system command Stop Predicate (SP), and if the predicate Prolog associated to the interrupt is defined as 'stop the execution of the current command', then after someone has entered the SP command, the associated Prolog interrupt will be activated and will stop the execution. Even if backtrack is activated between the entering of the SP command and the execution of the associated interrupt, the program is stopped. Thus, this kind of interrupt is insensitive to backtrack processing.

An example of an interrupt that must be sensitive to backtracking is shown below.

```
a(4,0) .
a(_,_) .
    :- ge(X,0) when not var(X) , a(X,1) .
    'ge(X,0) when not var(X)' activates the
    interrupt associated with
    ge(X,0) as soon as X receives a value.
```

In the example, the execution is the goal: −a(X, 1) tries to unify a(X,1) with a(4,0). To do that it binds X to 4. This triggers the interrupt associated with ge(X,0). Now ge(4,0)), so ge(4,0) will be added to the list of active interrupts. Then, Prolog attempts to unify 1 and 0. This step fails, so the backtrack activates. This backtrack restores X to the free state. As the interrupt ge(X,0) is related to the fact that X is not a variable, ge(X,0) must be removed from the list of active interrupts to avoid error. This kind of interrupt needs clearly to be sensitive to backtrack.

Following the update of the WAITITU/WAITITS word, an interrupt control block similar to FIG. 1 is added at the end of the linked list of interrupt control blocks anchored by the address contained in WAITI-TU/WAITITS. If an initial interrupt control block is already present, then the chain of next interrupt pointers 805 is traversed until a next interrupt pointer 805 equal to zero is found. The zeroed next interrupt pointer 805 is updated with the address of the new interrupt control block. Then, if backtracking is necessary to restore processing following the interrupt, information for backtracking is pushed onto the trail stack so backtrack will restore the proper values after interrupt processing.

The Prolog EXEC predicate processor is modified to check the contents of WAITITS/WAITITU before executing the next predicate. If a non-zero value is detected, then the first interrupt control block is activated and the associated WAITITS/WAITITU word is updated with the next interrupt control block found in ITNEXT 805.

If the update is on the WAITITS, then the trail stack is also updated. Next, a new frame is created by executing an allocate instruction and pushing the predicate descriptor of Proc and the arguments of Proc into the local frame. The arguments of p(*,*,*) are loaded in the Ai registers from the interrupt control block 810, 815 and 820. Then, the continuation pointer is set to the system address ITRET and the clauses associated with the interrupt are activated.

When interrupt processing is completed, Prolog returns to the address at ITRET and performs the following operations. First, the Ai registers are reloaded from the previous frame by employing the continuations pointer. Then, the predicate descriptor, E and P pointers are reloaded from the frame. Finally, execution commences from the address specified by the predicate descriptor.

FIGS. 2A-2F are block diagrams showing the logic associated with adding interrupt processing to Prolog in accordance with the subject invention. The stacks and other elements of Prolog are described in detail in the preceding text.

Figure 2A:
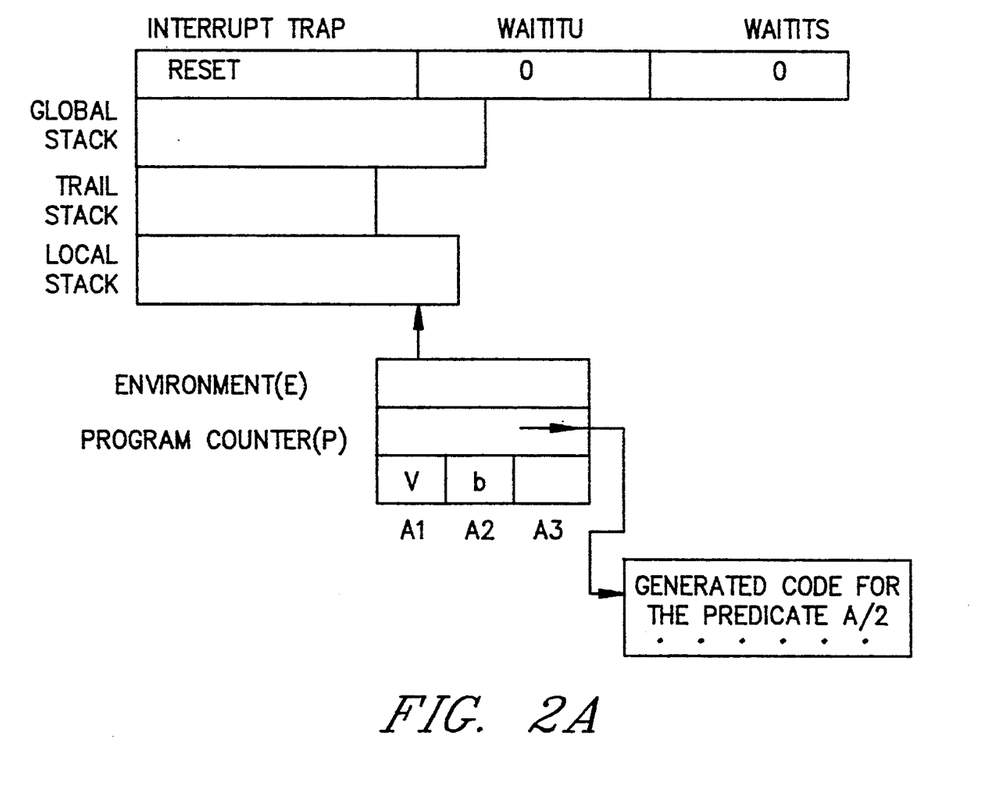
FIGS. 2A–2F are block diagrams showing the logic associated with adding interrupt processing to Prolog in accordance with the subject invention.

FIG. 2A shows the state of Prolog when the test for interrupt is done before the execution of an example predicate a(V,b) when no interrupt is active.

Figure 2B:
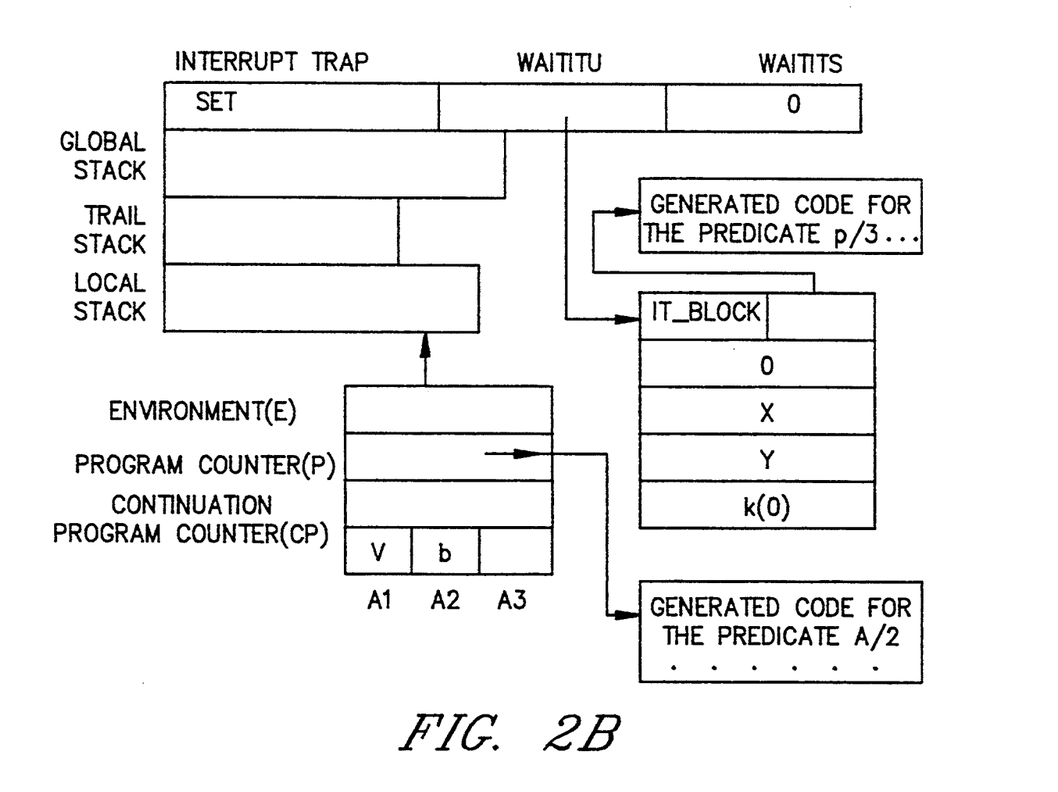

FIG. 2B shows Prolog's state before the test for interrupt execution just before the execution of the predicate a(V,b) when a Type 2 interrupt associated with predicate p(X,Y,k(O)) is waiting.

Figure 2C:
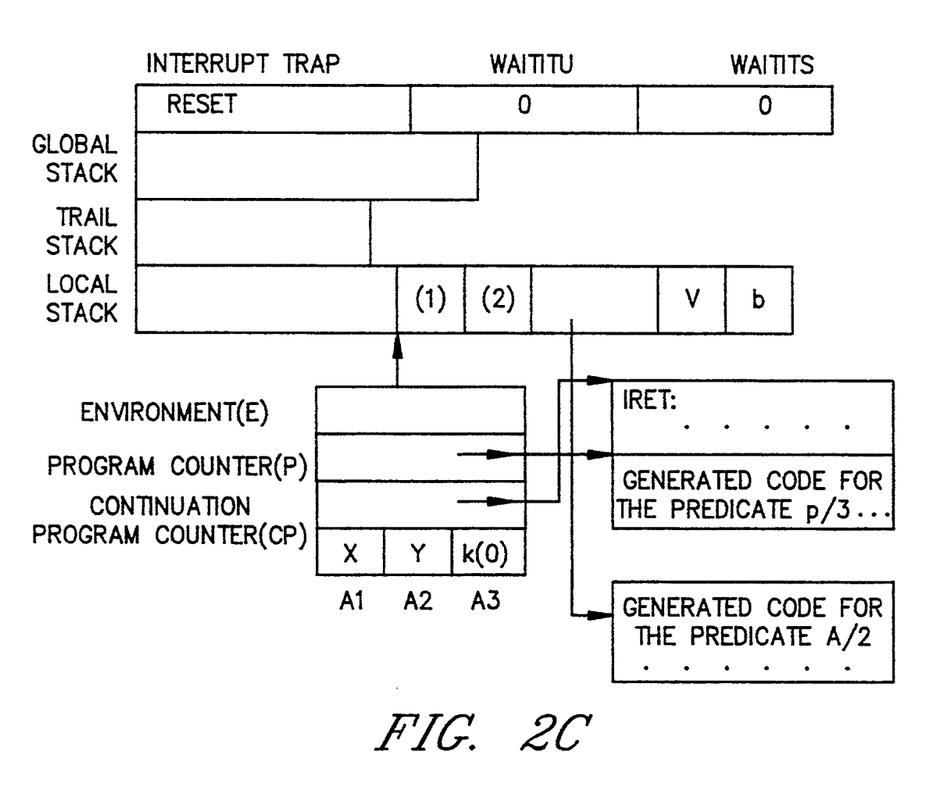

FIG. 2C shows Prolog's state when a Type 2 interrupt associated with the predicate p(X,Y,k(O)) has been processed before the execution of the predicate a(V,b).

Figure 2D:
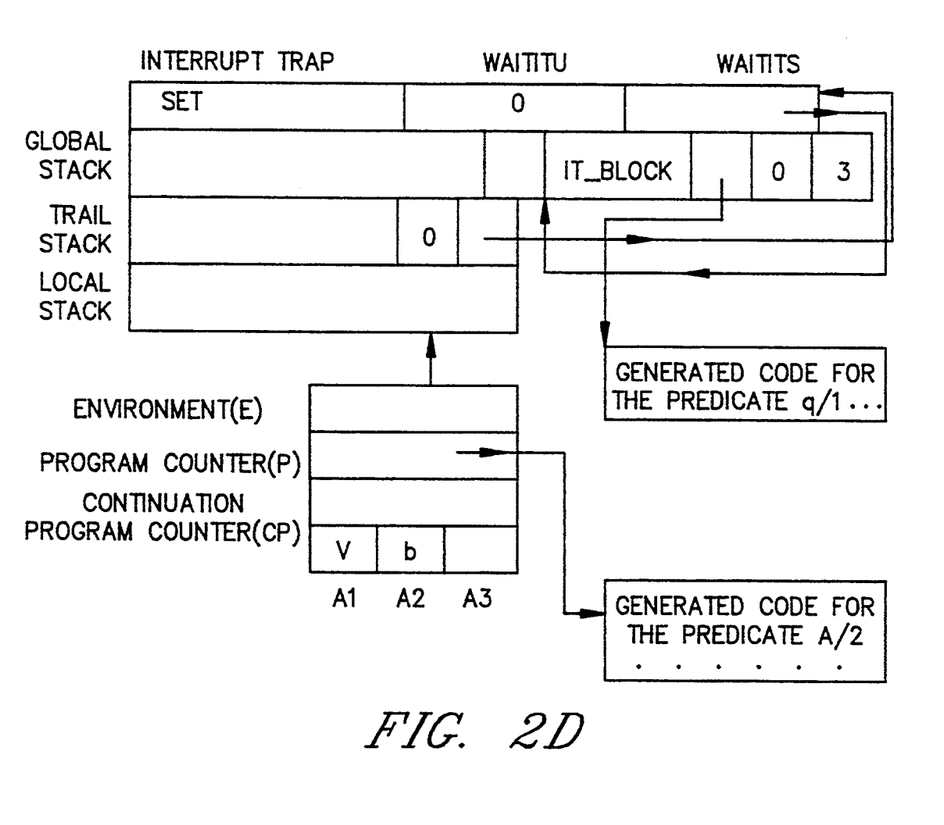

FIG. 2D shows Prolog's state before testing for interrupt prior to the execution of predicate a(V,b). There is a Type 1 interrupt associated with the predicate q(3) waiting.

Figure 2E:
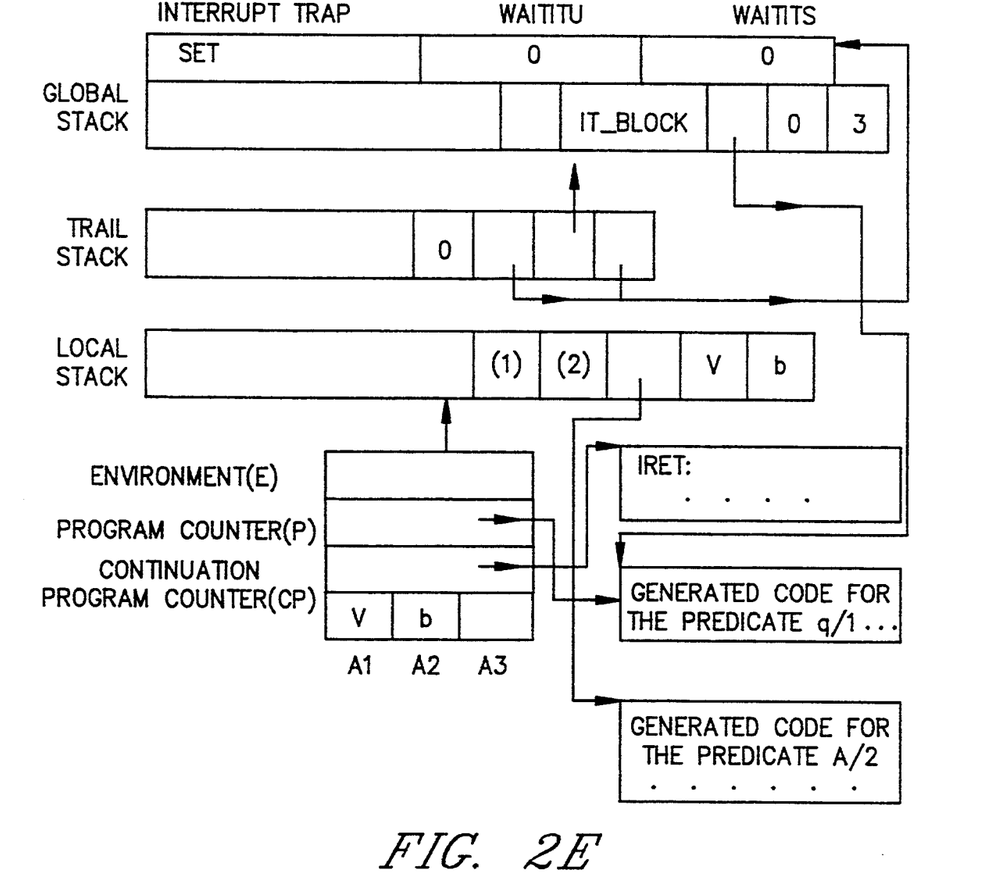

FIG. 2E shows Prolog's state when a Type 1 interrupt associated with the predicate q(3) has been processed before the execution of the predicate a(V,b).

Figure 2F:
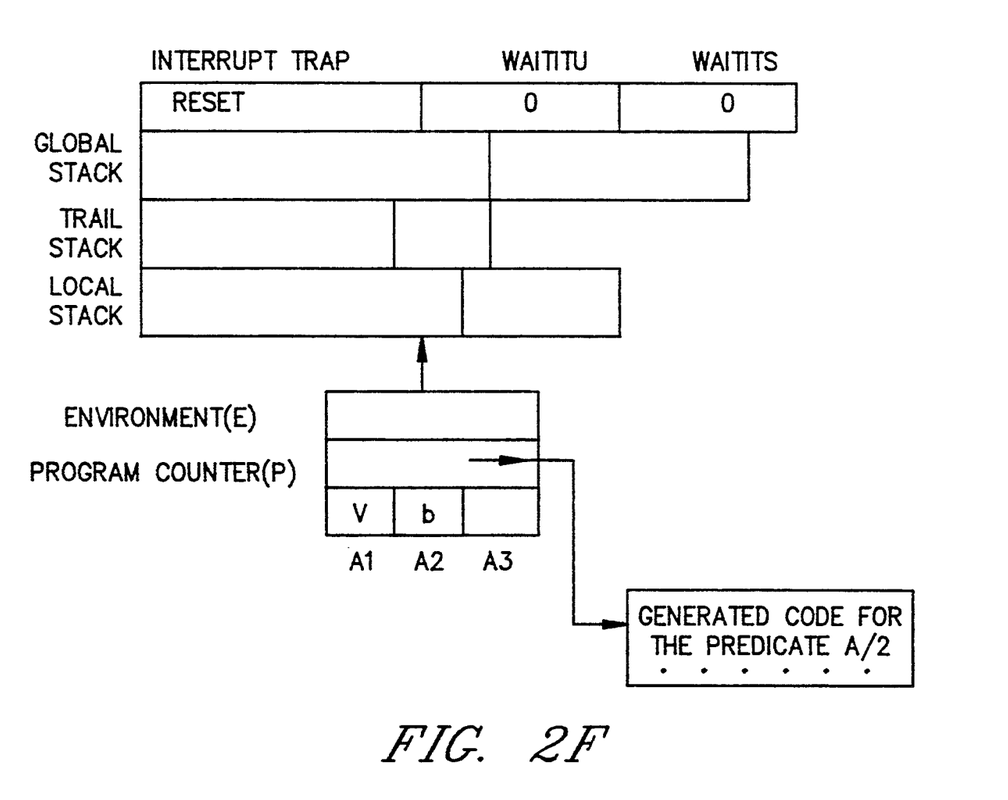
Figure 3:
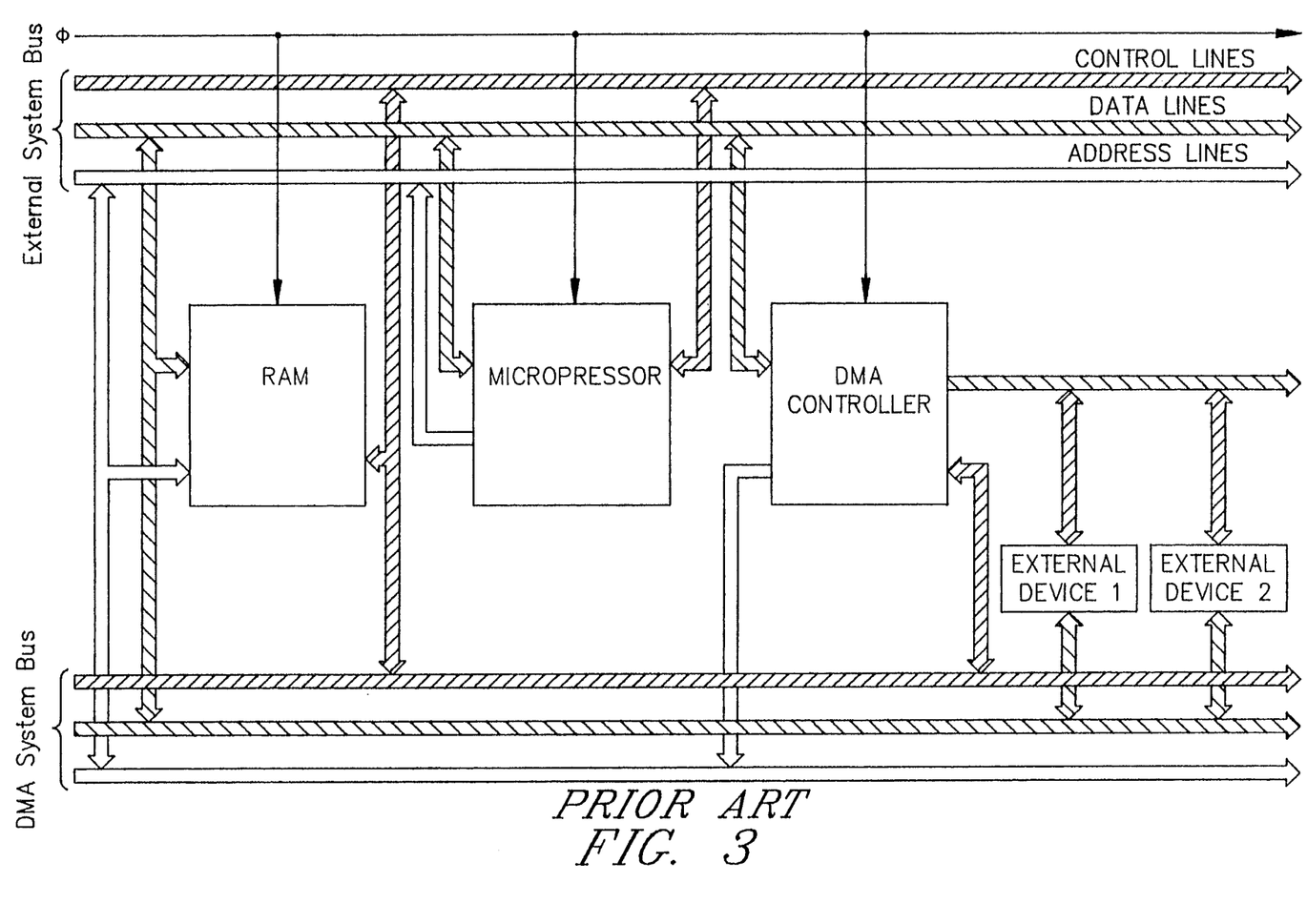
FIGS. 3–5 are prior art systems for processing interrupts.
Figure 4:
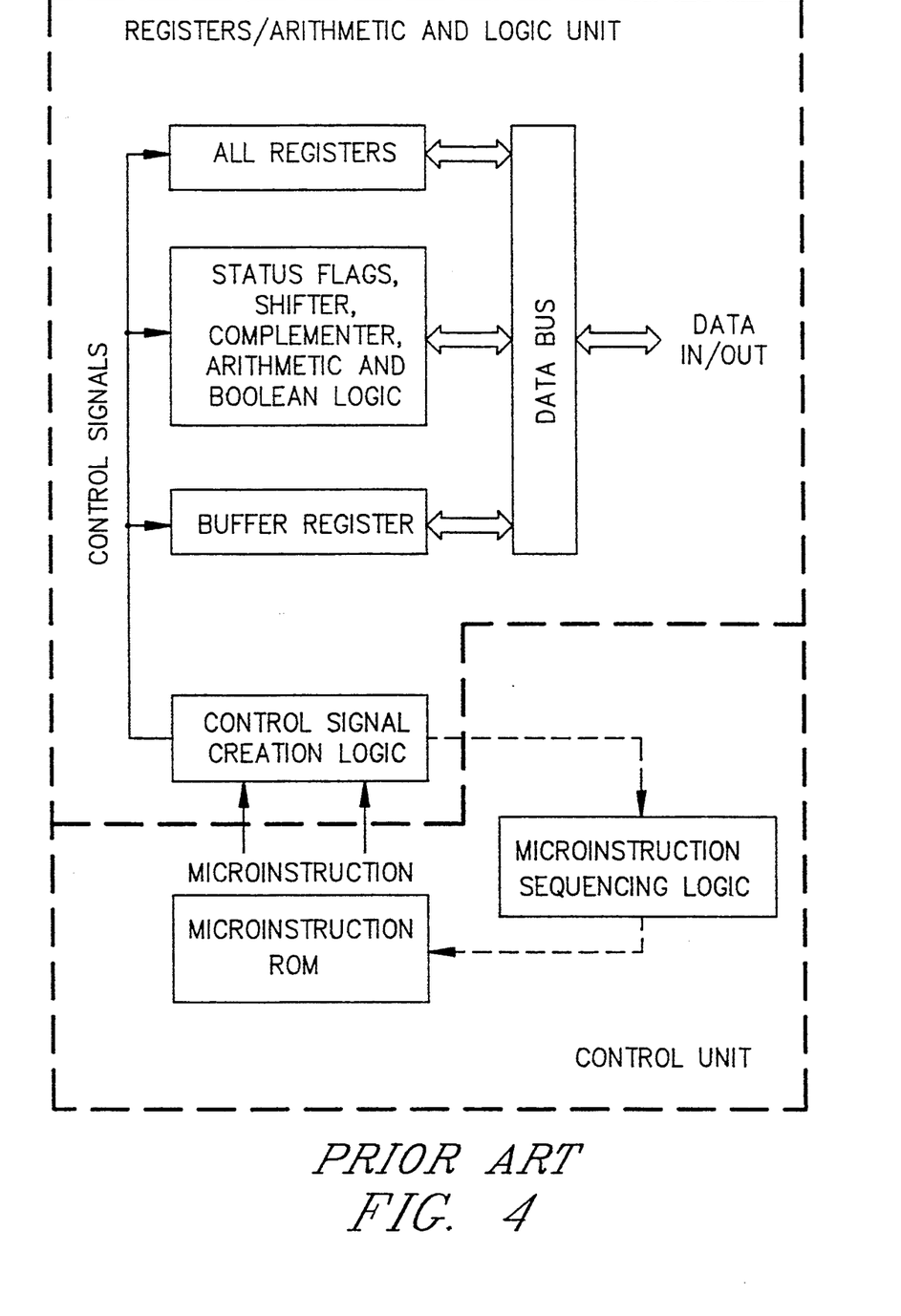
Figure 5:
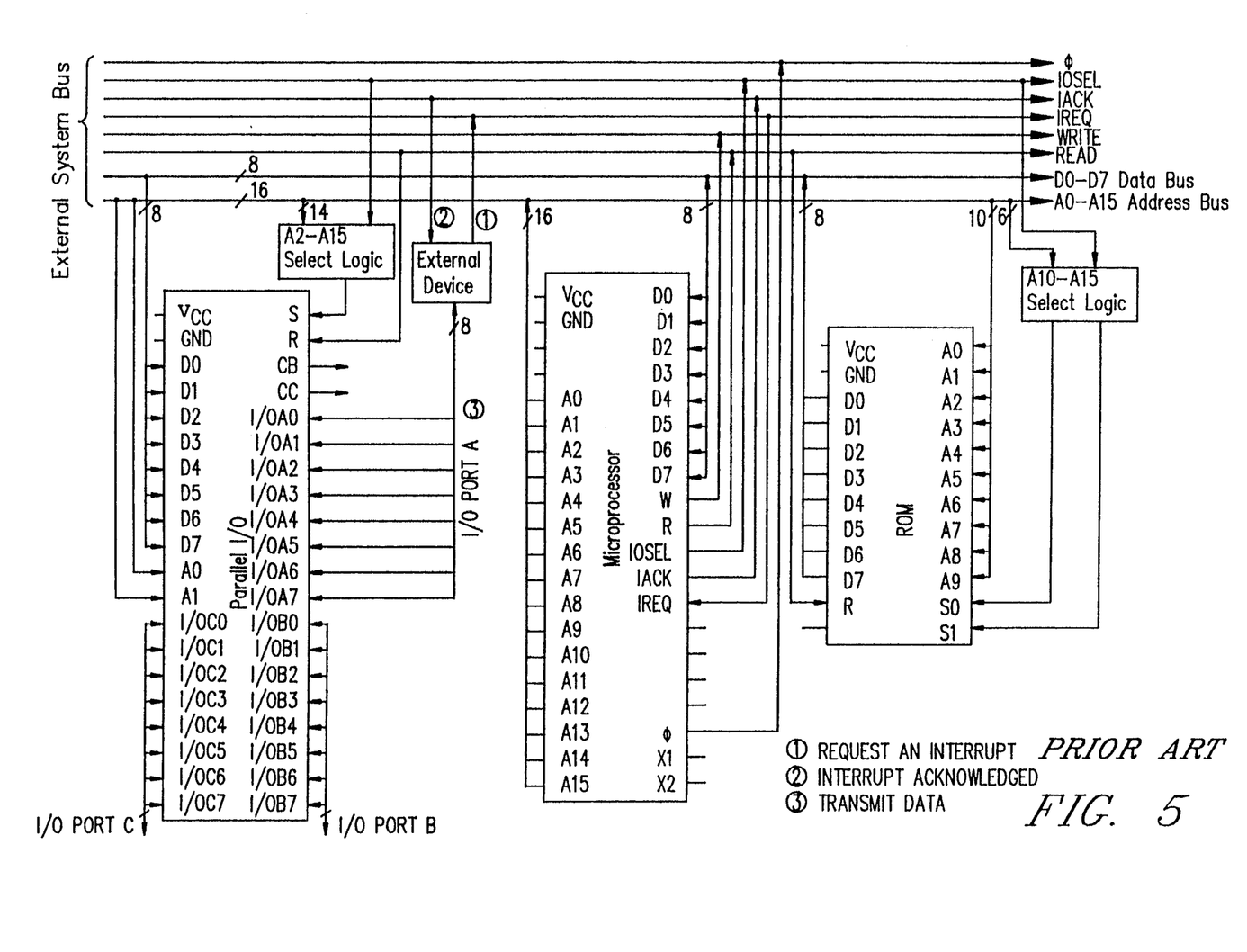

FIG. 2F shows Prolog's state when a Type 1 interrupt associated with the predicate q(3) was processed just before the execution of the predicate a(V,b).

Rerouting the first instruction of the common invocation sequence facilitates PROLOG's logical interrupt processing without any polling overhead.

While the invention has been described in terms of a preferred embodiment in a specific system environment, those skilled in the art recognize that the invention can be practiced, with modification, in other and different operating systems within the spirit and scope of the appended claims.

What is claimed is:

1. A method for operating a computer system to process a predicate associated with an interrupt when the interrupt occurs during the processing of another predicate, comprising the steps of:
   (a) commencing processing of a first predicate;
   (b) detecting the occurrence of an interrupt associated with a second predicate;
   (c) storing interrupt information, further comprising the steps of
      (i) determining whether the interrupt is sensitive to backtracking,
      (ii) storing data indicative of backtracking sensitivity, and
      (iii) storing data indicative of the occurrence of the interrupt and the second predicate;
   (d) completing processing of the first predicate; and
   (e) processing the second predicate using the interrupt information.

2. The method of claim 1 wherein the step of processing the second predicate includes instantiating a frozen variable.

3. The method of claim 1 wherein the step of processing the second predicate includes performing garbage collection.

4. The method of claim 1 wherein the step of processing the second predicate includes executing a debugging program.

5. The method of claim 1 wherein the step of processing the second predicate includes responding to user input via terminal entry.

6. The method of claim 1 wherein the step of storing interrupt information includes storing an address of a logical interrupt handler at a location where the address of the predicate invocation sequence is located.

7. A method for operating a computer system having common storage to process a predicate associated with an interrupt when the interrupt occurs during the processing of another predicate, comprising the steps of:
   (a) commencing processing of a first predicate;
   (b) detecting the occurrence of an interrupt associated with a second predicate;
   (c) storing in the common storage interrupt control block information, further comprising the steps of
      (i) determining whether the interrupt is sensitive to backtracking,
      (ii) storing data indicative of backtracking sensitivity, and
      (iii) storing data indicative of the second predicate's predicate descriptor and arguments;
   (d) storing in the common storage interrupt flag information indicative of the occurrence of the interrupt and the location of the interrupt control block;
   (e) completing processing of the first predicate;
   (f) reading the interrupt flag to ascertain the location of the interrupt control block;
   (g) reading the interrupt control block from the common storage to ascertain the location of the second predicate's predicate descriptor and arguments; and
   (h) processing the second predicate.

8. The method of claim 7 wherein the step of processing the second predicate includes instantiating a frozen variable.

9. The method of claim 7 wherein the step of processing the second predicate includes performing garbage collection.

10. The method of claim 7 wherein the step of processing the second predicate includes executing a debugging program.

11. The method of claim 7 wherein the step of processing the second predicate includes responding to user input via terminal entry.

12. The method of claim 7 wherein the step of storing interrupt flag information includes storing an address of a logical interrupt handler at a location where the address of the predicate invocation sequence is located.

13. The method of claim 7 further including the step of storing the interrupt control block information in a linked list which includes previously stored unprocessed interrupt control blocks.

14. A computerized system for processing a predicate associated with an interrupt when the interrupt occurs during the processing of another predicate, comprising:
   (a) means for commencing processing of a first predicate;
   (b) means for detecting the occurrence of an interrupt, the interrupt being associated with a second predicate;
   (c) means for storing interrupt information comprising
      (i) means for determining whether the interrupt is sensitive to backtracking,
      (ii) means for storing data indicative of backtracking sensitivity, and
      (iii) means for storing data indicative of the occurrence of the interrupt and the second predicate;
   (d) means for completing processing of the first predicate; and
   (e) means for processing the second predicate using the interrupt information.

15. The system of claim 14 wherein the means for processing the second predicate includes means for instantiating a frozen variable.

16. The system of claim 14 wherein the means for processing the second predicate includes means for performing garbage collection, means for executing a debugging program or means for responding to user input via terminal entry.

17. The system of claim 14 wherein the means for storing interrupt information includes means for storing the address of a logical interrupt handler at a location where the address of the predicate invocation sequence is located.

* * * * *